(12) United States Patent
Kim

(10) Patent No.: US 6,934,428 B2
(45) Date of Patent: Aug. 23, 2005

(54) VARIABLE OPTICAL ATTENUATOR HAVING WAVEGUIDES AND MEMS ACTUATOR

(75) Inventor: Sung-chul Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 269 days.

(21) Appl. No.: 10/196,376

(22) Filed: Jul. 17, 2002

(65) Prior Publication Data

US 2003/0063891 A1 Apr. 3, 2003

(30) Foreign Application Priority Data

Sep. 29, 2001 (KR) ........................................ 2001-61043

(51) Int. Cl.[7] ................................................ G02B 6/35
(52) U.S. Cl. ........................................ 385/14; 385/18
(58) Field of Search ........................ 385/14–19, 43, 385/140, 129

(56) References Cited

U.S. PATENT DOCUMENTS

| | | | | |
|---|---|---|---|---|
| 5,706,371 A | * | 1/1998 | Pan | 385/11 |
| 5,917,972 A | * | 6/1999 | Davies | 385/43 |
| 6,031,946 A | * | 2/2000 | Bergmann et al. | 385/18 |
| 6,118,915 A | * | 9/2000 | Sato | 385/39 |
| 6,163,643 A | * | 12/2000 | Bergmann et al. | 385/140 |
| 6,246,826 B1 | * | 6/2001 | O'Keefe et al. | 385/140 |
| 6,265,239 B1 | * | 7/2001 | Aksyuk et al. | 438/52 |
| 6,292,616 B1 | * | 9/2001 | Tei et al. | 385/140 |
| 6,363,183 B1 | * | 3/2002 | Koh | 385/19 |
| 6,459,845 B1 | * | 10/2002 | Lee et al. | 385/140 |
| 6,525,863 B1 | * | 2/2003 | Riza | 359/290 |
| 6,718,114 B2 | * | 4/2004 | Hong et al. | 385/140 |
| 6,738,538 B2 | * | 5/2004 | Antaki et al. | 385/14 |

* cited by examiner

*Primary Examiner*—Joseph Williams
*Assistant Examiner*—Dalei Dong
(74) *Attorney, Agent, or Firm*—Sughrue Mion, PLLC

(57) ABSTRACT

A variable optical attenuator having a waveguide and an MEMS actuator. In the variable optical attenuator, the input waveguide and the output waveguide face each other and are separated by a gap. The input waveguide increases in width along an optical path in order to expand the width of the light entering through an optical fiber of the input end. The output waveguide decreases in width along the optical path in order to make the expanded light converge towards the optical fiber of the output end. The optical shutter moves in the space between the two waveguides under the control of the MEMS actuator and attenuates the amount of the light. The variable optical attenuator having such configuration can be mass-produced in array form and are unaffected by ambient temperature changes.

9 Claims, 6 Drawing Sheets

VARIABLE OPTICAL ATTENUATOR HAVING WAVEGUIDES AND MEMS ACTUATOR

BACKGROUND OF THE INVENTION

1. Field of the Invention

The present invention relates to an optical attenuator, and more particularly, to a variable optical attenuator for attenuating the amount of the light transmitted through an optical fiber variably. The present application is based on Korean Patent Application No. 2001-61043, filed Sep. 29, 2001, which is incorporated herein by reference.

2. Description of the Related Art

As optical communication systems using optical fibers draw more attention, technologies related to optical communication devices or elements widely used in communication networks are under development proactively. As one of the optical communication elements, an optical attenuator attenuates a certain amount of the incident light and outputs the attenuated light. The optical attenuator includes a fixed optical attenuator which attenuates a fixed amount of the light, and a variable optical attenuator which attenuates a variable amount of the light. The optical attenuator is used when the light transmission factors vary depending on the optical communication elements. For example, in wavelength division multiplexing (WDM) systems which use lights with different wavelengths, the systems are designed to use the same intensities of the lights while laser beams used as light sources have different intensities. The optical attenuator compensates for the different light intensities. In addition, because channels in an optical switch or a multiplexer/demultiplexer of the WDM system have different light transmission factors, the optical attenuator makes the different light transmission factors identical. Especially, the variable optical attenuator is necessary to change the light transmission factors since different optical paths cause different intensities of light loss.

To satisfy the needs for the above applications, various types of optical attenuators have been developed. FIG. 1 illustrates one type of optical attenuator. The optical attenuator shown in FIG. 1 adopts Graded-index (GRIN) rod lens 12 and 22, and an optical shutter 25.

With reference to FIG. 1, the light entering through the optical fiber 11 of the input end is expanded and output by the input GRIN rod lens 12. The width of the light is expanded to about 10 $\mu$m~1 mm or more. The expanded light output by the input GRIN rod lens 12 is input to the output GRIN rod lens 22 which faces and is separated from the input GRIN rod lens by a certain gap. The light is converged within the output GRIN rod lens 22 and output through the optical fiber 21 of the output end. On the optical path, an optical shutter 25 designed to attenuate the intensity of the light is positioned in the space 23 between the two GRIN rod lenses 12 and 22 and intercepts some of the progressing light. The optical shutter 25 moves within the space 23 under the control of the actuator 27 so that it can adjust the amount of the intercepted light, and the controller 29 controls the movement distance of the optical shutter 25.

As described above, the existing variable optical attenuator includes the GRIN rod lenses 12 and 22. Since the GRIN rod lenses can act as collimators, the output light does not spread and becomes parallel light. Therefore, however long the distance between the GRIN rod lenses is, the light loss can be minimized in the space 23. Moreover, because the GRIN rod lenses 12 and 22 can expand the width of the light to 1 mm or more, the movement distance of the optical shutter 25 may be long. If only the optical fibers 11 and 21 are used without the GRIN rod lenses 12 and 22, too narrow width of the light necessitates the adjustment of the optical shutter 25 with a precision of 0.1 $\mu$m or less. It is very difficult to achieve the precision and guarantee the reliability. On the contrary, if the GRIN rod lenses 12 and 22 are used, a separate device is necessary to align the GRIN rod lenses precisely. Generally, an active align device is used to assemble the GRIN rod lenses in the optimized condition so that the light can be transmitted from the optical fiber 11 to the optical fiber 21. That is the reason why the optical attenuator having the GRIN rod lenses 12 and 22 is not suited for mass-production.

FIG. 2 illustrates another type of existing optical attenuator. The optical attenuator shown in FIG. 2 adopts a waveguide 31 instead of the GRIN rod lens, and is applied to an arrayed waveguide grating (AWG) which is a WDM demultiplexer. That is, only a heater 33 needs to be installed on the waveguide of the optical communication element to implement the optical attenuator shown in FIG. 2. As for the optical attenuator having such configuration, when the heater 33 heats the waveguide 31, the characteristics of the light transmission of the waveguide 31 is changed and as a result, the transmission factors of the light can be adjusted.

When compared to the optical attenuator shown in FIG. 1, the existing variable optical attenuator shown in FIG. 2 features a simpler structure and a more streamlined manufacturing process, and can be mass-produced in array forms. However, the optical attenuator shown in FIG. 2 responds to changes in the ambient temperature sensitively in that the heater heats the characteristics of the light transmission. That is, changing ambient temperatures surrounding the element causes the characteristics of the waveguide 31 to be changed and further may lead to unnecessary change of the characteristics. Therefore, a temperature adjustment device is required to calibrate temperatures.

SUMMARY OF THE INVENTION

To solve the above-described problems, it is an object of the present invention to provide a variable optical attenuator having increasing widths that can be mass-produced in array forms, eliminating the need for controlling an optical shutter in a highly precise manner.

It is another object of the present invention to provide a variable optical attenuator having an MEMS actuator that is not impacted by ambient temperatures.

To achieve the above objects of the present invention, there is provided a variable optical attenuator including: an input waveguide which has increasing widths in line with an optical path in order to expand the width of the light entering through an optical fiber of the input end; an output waveguide which faces and is separated from the input waveguide by a certain gap and has decreasing widths in line with the optical path in order to make the expanded light converge towards the optical fiber of the output end; an optical shutter which moves on the space between the input waveguide and the output waveguide and variably attenuates the amounts of the light; an MEMS actuator which moves the optical shutter; and a controller for controlling the MEMS actuator.

According to the variable optical attenuator of the present invention, the input waveguide may expand the width of the light and attenuate the intensity of the light in several levels, eliminating the need for moving the optical shutter with high precision.

A waveguide for control branched off from the output waveguide is adjacent to the output end of the output waveguide, and a photodetector is in front of the output end of the waveguide for control. The controller controls the MEMS actuator depending on the intensity of the light sensed by the photodetector and can adjust the position of the optical shutter.

The widths of the input waveguide and the output waveguide can be increased/decreased in a linear shape or an arch shape. It is preferable that the input waveguide and the output waveguide are funnel-shaped. The arch-shaped input waveguide or the funnel-type input waveguide not only expand the widths of the light entering through the optical fiber of the input end but also make the light become parallel light. Therefore, the light loss in the space between the input waveguide and the output waveguide can be minimized.

A comb drive or a scratch drive actuator may be used as the MEMS actuator in order to prevent the ambient temperatures from influencing the variable optical attenuator of the present invention.

Preferably, the one side plane facing the opening of the input waveguide is tilted by some degrees of angle so that the light reflected against the optical shutter can be prevented from returning to the opening of the input waveguide.

The input waveguide, the output waveguide, the optical shutter and the MEMS actuator can be implemented monolithically on one board. In addition, the variable optical attenuator of the present invention can be implemented with the combination of a first board on which the input waveguide and the output waveguide are formed, and a second board on which the optical shutter and the MEMS actuator are formed.

According to the present invention, since components of the variable optical attenuator can be configured on a board monolithically, the variable optical attenuator can be mass-produced in array forms in a simpler manufacturing process.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Preferred embodiments of a variable optical attenuator according to the present invention will be described in detail with reference to the accompanying drawings.

Figure 3:
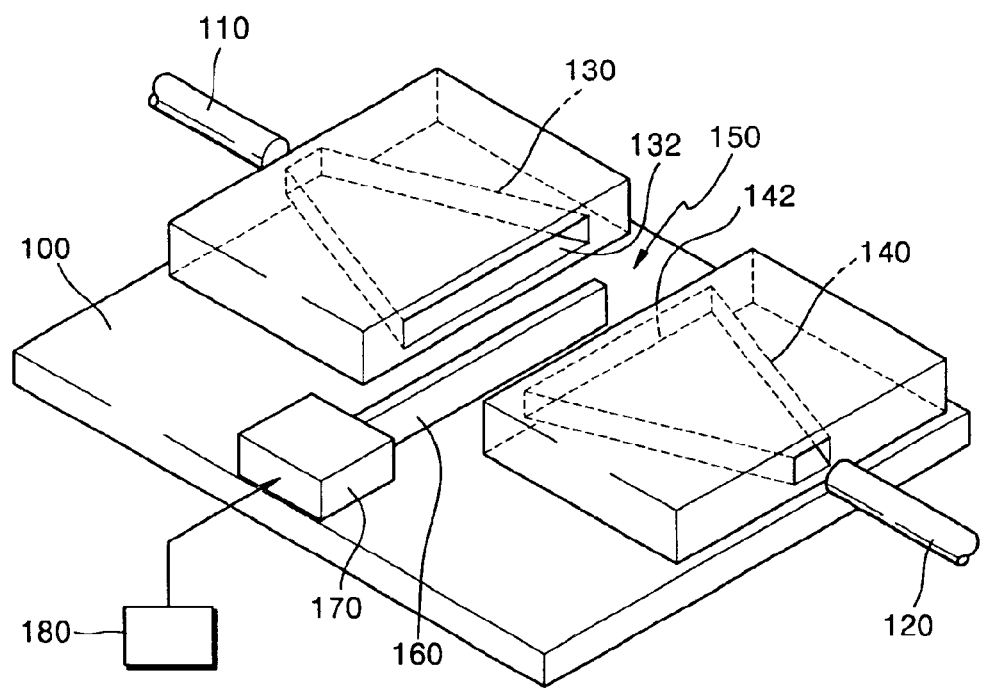
FIG. 3 is a perspective view showing the configuration of the variable optical attenuator according to a first embodiment of the present invention.

FIG. 3 is a perspective view showing the configuration of the variable optical attenuator according to the first embodiment of the present invention.

With reference to FIG. 3, the variable optical attenuator according to the present invention includes an input waveguide 130, an output waveguide 140, an optical shutter 160 and a microelectromechanical system (MEMS) actuator 170 for moving the optical shutter.

The input waveguide 130 implemented on a board 100 increases in width along the optical path. That is, the width of the input waveguide 130 increases linearly from one end adjacent to the optical fiber 110 of the input end to the other end adjacent to the opening 132. Therefore, the light entering through the optical fiber 110 of the input end to the input waveguide 130 is expanded and output from the opening 132.

The output waveguide 140 is also implemented on the board 100 to face the input waveguide 130 by a certain gap. The output waveguide 140 and the input waveguide 130 are symmetrically arranged about the space 150. The width of the output waveguide decreases linearly along the optical path. That is, the width of the output waveguide 140 decreases linearly from the opening 142 of one end facing the input waveguide 130 towards the optical fiber 120 of the output end. Therefore, the light expanded and output by the input waveguide 130 enters through the opening 142 of the output waveguide 140 and becomes converged towards the optical fiber of the output end 120.

The optical shutter 160 is designed to move in the space 150 between the input waveguide 130 and the output waveguide 140. The optical shutter 160 is made of material that prevents light transmission. Within the space 150, the optical shutter attenuates the intensity of the output light by intercepting some amount of the light progressing from the input waveguide 130 towards the output waveguide 140. The optical shutter 160 can move back and forth within the space 150 and the attenuated amount of the light can be adjusted depending on the position of the optical shutter 160.

According to the present invention, since the width of the light is expanded by the input waveguide 130 whose width increases along the optical path, the optical shutter 160 can move more largely and need not be controlled with high precision. That is, if the width of the light is narrow, moving the optical shutter 160 with high precision is necessary to attenuate the light variably. However, it is very difficult to adjust the optical shutter with high precision. On the contrary, if the width of the light is wide, the optical shutter 160 need not be moved with high precision and can control the attenuated amounts of light to the desired several levels.

Figure 4A:
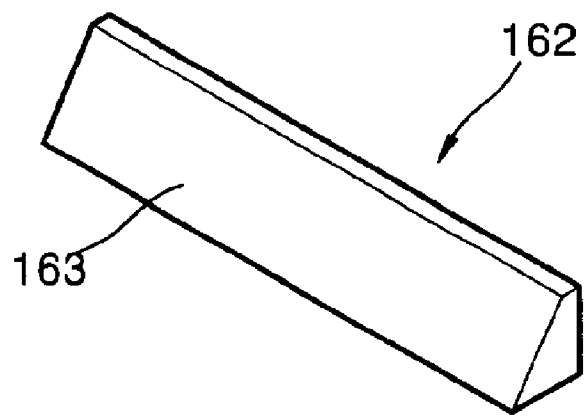
FIGS. 4A and 4B are perspective views showing variances of the optical shutter shown in FIG. 3.
Figure 4B:
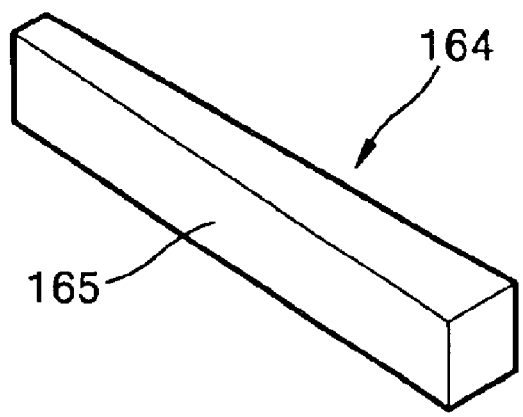

The optical shutter 160 can be cuboid as shown in FIG. 3 or can have other configurations as shown in FIGS. 4A and 4B. The optical shutters 162 and 164 shown in FIGS. 4A and 4B have sides 163 and 165 which are tilted by some degrees and face the opening 132 of the input waveguide 130. The optical shutter 162 shown in FIG. 4A has one side 163 vertically tilted while the optical shutter 164 shown in FIG.

4B has one side 165 tilted horizontally. The tilted sides of the optical shutters 162 and 164 prevent the light reflected against the optical shutter from returning to the opening 132 of the input waveguide 130.

Referring to FIG. 3 again, the optical shutter 160 can move back and forth under the control of the MEMS actuator 170 implemented on one end of the optical shutter 160. The controller 180 controls the MEMS actuator 170 to move the optical shutter 160 back and forth in such a way that desired attenuation amounts of the light can be obtained. There are various types of the MEMS actuators 170. It is preferable that the widely known comb drive or an SDA (Scratch Drive Actuator) can be used, and is formed on the board 100 like the waveguides 130 and 140. For example, the comb drive includes fixed fingers attached to a stationary beam and movable fingers attached to a movable stage. In the comb drive, if the bias voltage is provided to the selected fixed fingers, the movable stage moves back and forth. Then, if the optical shutter 160 is connected to the movable stage, the optical shutter 160 also moves as the movable stage does. As described above, the MEMS actuator 170 designed to move the optical shutter 160 enables the present invention not to be impacted by a change in ambient temperature.

The components of the optical attenuator shown in FIG. 3, that is, the input waveguide 130, the output waveguide 140, the optical shutter 160 and the MEMS actuator 170 are implemented monolithically on the board 100. Therefore, the optical attenuator can be mass-produced in array forms in a simpler manufacturing process.

Figure 5:
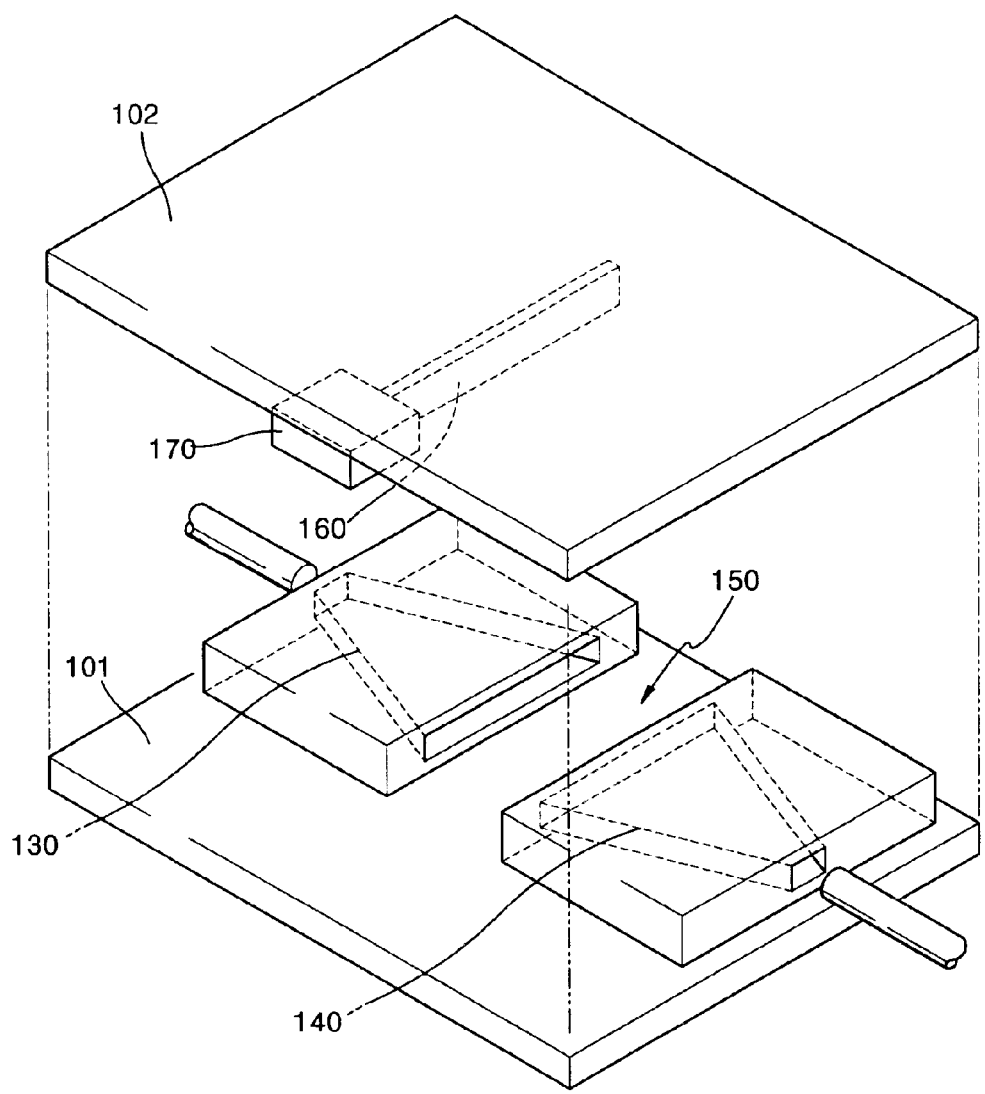
FIG. 5 is an exploded perspective view showing another manufacturing method of the variable optical attenuator shown in FIG. 3.

As shown in FIG. 5, the optical attenuator of the present invention can be implemented with a combination of components formed on two boards 101 and 102. To be more specific, in order to implement the present invention, the input waveguide 130 and the output waveguide 140 are placed on the first board 101 with a space 150 between the two waveguides. The optical shutter 160 and the MEMS actuator 170 are placed on the second board 102. Then, the first board 101 and the second board 102 are combined in such a way that the optical shutter 160 is positioned in the space 150.

Figure 1:
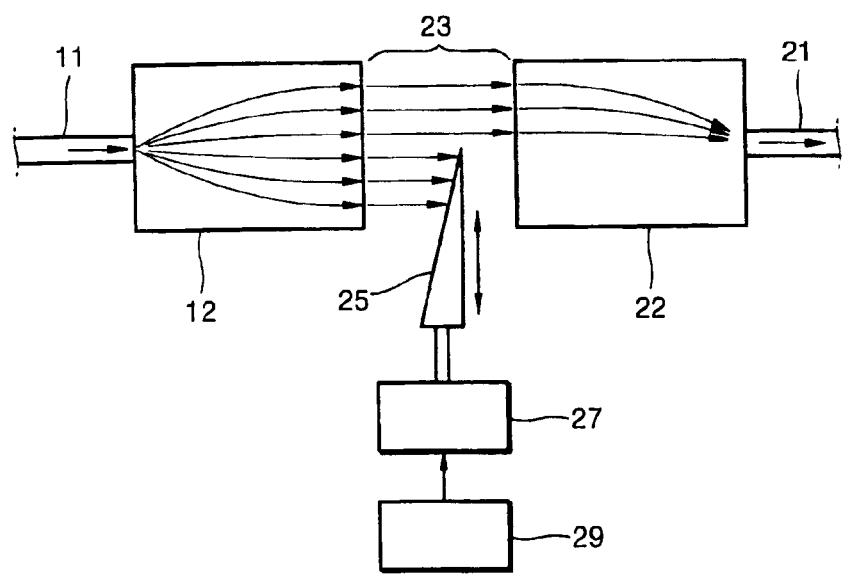
FIG. 1 is a configuration view showing one embodiment of an existing variable optical attenuator.
Figure 2:
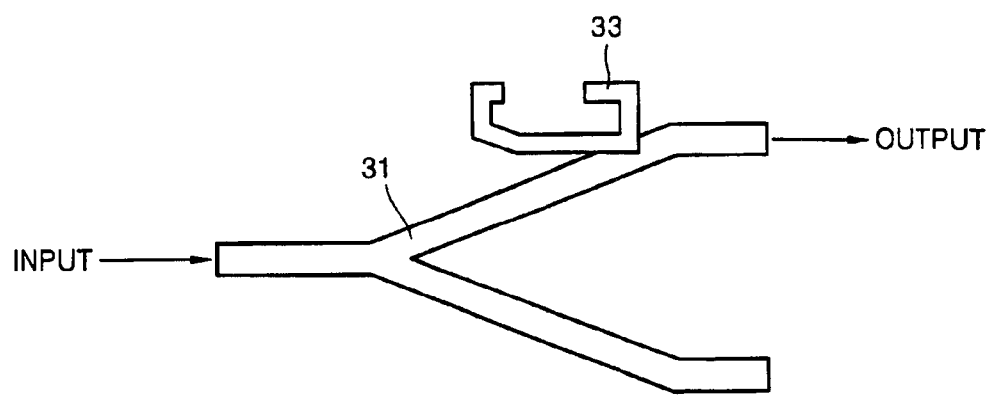
FIG. 2 is a configuration view showing another embodiment of the existing variable optical attenuator.
Figure 6:
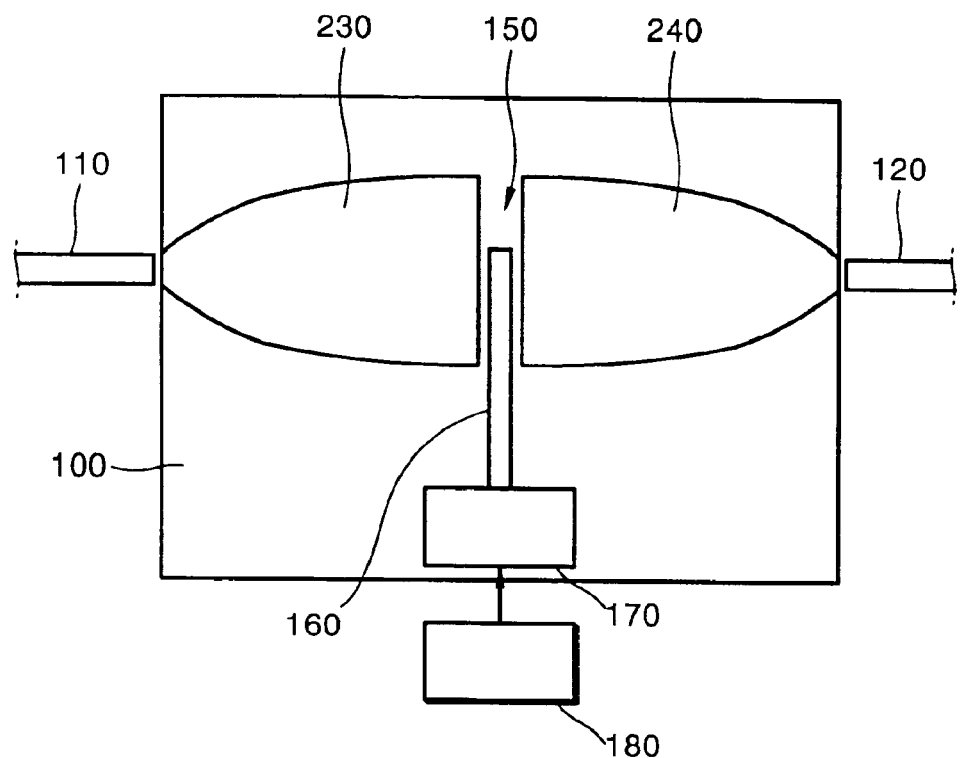
FIG. 6 shows the configuration of the variable optical attenuator according to a second embodiment of the present invention.
Figure 7:
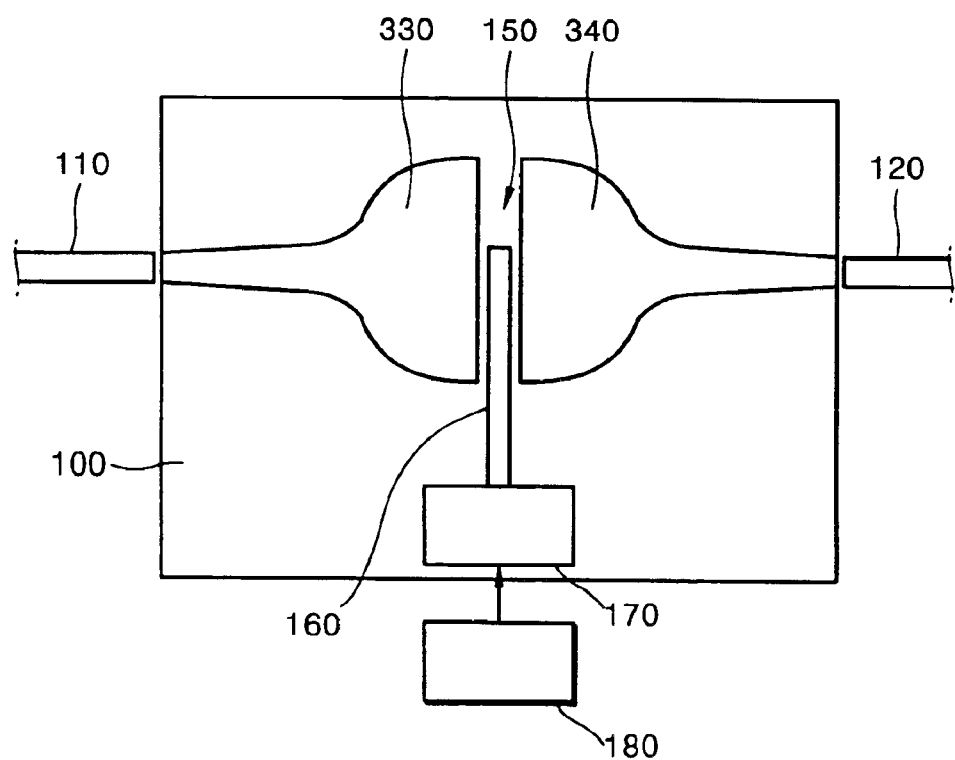
FIG. 7 shows the configuration of the variable optical attenuator according to a third embodiment of the present invention.
Figure 8:
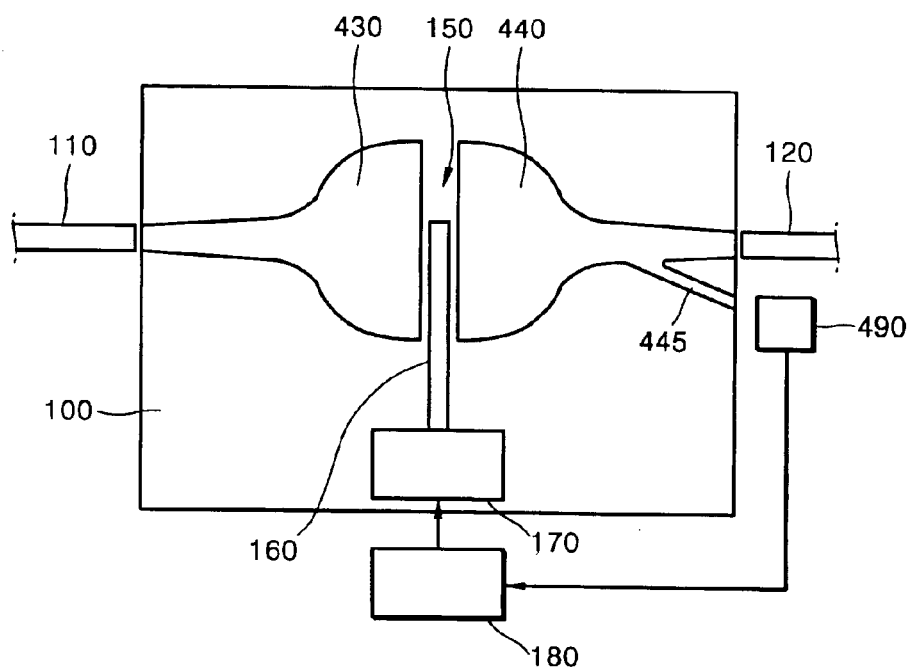
FIG. 8 shows the configuration of the variable optical attenuator having a waveguide for control according to a fourth embodiment of the present invention.

FIGS. 6, 7 and 8 show other embodiments of the variable optical attenuator of the present invention. Here, the same reference marks as shown in the embodiment of FIG. 1 denote the same elements.

With reference to FIG. 6, the widths of the input waveguide 230 and the output waveguide 240 increases or decreases in an arch shape. The optical attenuator shown in FIG. 7 includes an input waveguide 330 and an output waveguide 340 that are funnel-shaped. That is, the width of the input waveguide 330 is slowly expanded or maintained near the optical fiber 110 of the input end, and expanded drastically in a half-circle form near the space 150. The output waveguide 340 has a symmetrical configuration when compared to the input waveguide 330.

The input waveguides 230 and 330 shown in FIGS. 6 and 7 not only expand the light entering through the optical fiber 110 of the input end but also make the light parallel light. Therefore, the light loss that may happen within the space 150 can be minimized.

FIG. 8 shows a variable optical attenuator having a waveguide for control 445. The variable optical attenuator shown in FIG. 8 has the funnel-type input waveguide 430 and output waveguide 440 as shown in FIG. 7. However, the input waveguide 430 and the output waveguide 440 can have the configurations shown in FIGS. 3 and 6. The waveguide for control 445 is branched off from the output waveguide 440 and adjacent to the output end of the output waveguide 440. In front of the output end of the waveguide for control 445, there is a photodetector 490. The photodetector 490 detects the amount of light output from the waveguide for control 445 and feeds back the detection result to the controller 180. Then, the controller 180 controls the MEMS actuator 170 depending on the intensity of the light detected by the photodetector 490 and adjusts the position of the optical shutter 160.

Figure 9:
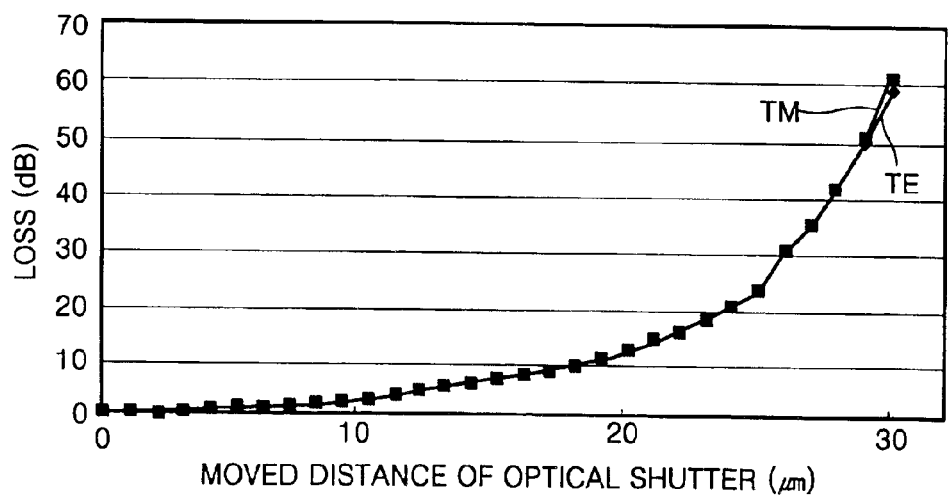
FIG. 9 is a graph showing the attenuated amounts of the light depending on the movement distance of the optical shutter of the variable optical attenuator of the present invention.

FIG. 9 is a graph showing the attenuated amounts of the light depending on the movement distance of the optical shutter of the variable optical attenuator of the present invention. The graph shows the light loss occurring when the optical shutter moves to the space between the waveguides by 1 $\mu$m in the simulation conducted with the BMM-CAD program of OPTIWAVE, Inc. The simulation result of FIG. 9 demonstrates that the farther the optical shutter moves, the greater is the amount of attenuated light.

The optical attenuator should be designed to minimize the Polarization Dependent Loss (PDL) generated when the polarization status of the light input to the input waveguide causes the intensity of the light output through the output waveguide to change.

The graph of FIG. 9 shows the light loss of the Transverse Electric (TE) wave and the Transverse Magnetic (TM) which are perpendicular to each other is almost the same in terms of the attenuated amount of 50 dB. Therefore, the optical attenuator according to the present invention has little PDL.

According to the present invention, since the width of the light is expanded by the input waveguide whose width increases along the optical path, the optical shutter need not be controlled with high precision and can control the attenuated amount of light to the desired several levels. Moreover, if the waveguide for control and the photodetector are added in the present invention, the position of the optical shutter can be adjusted automatically depending on the desired light attenuation amount. The MEMS actuator designed to move the optical shutter enables the present invention not to be impacted by the change of ambient temperatures.

According to the present invention, since components of the variable optical attenuator can be configured on a board monolithically, the variable optical attenuator can be mass-produced in array form in a simpler manufacturing process.

Although specific embodiments of the invention have been described herein for illustrative purposes, various modifications and equivalents thereof can be made without departing from the spirit and scope of the invention, as will be recognized by those skilled in the relevant art. Accordingly, the invention is not limited the disclosure, but instead its scope is to be determined entirely by the following claims.

What is claimed is:

1. A variable optical attenuator comprising:
   an input waveguide which increases in width along an optical path in order to expand the width of light entering through an optical fiber of an input end of the input waveguide;
   an output waveguide which faces and is separated from the input waveguide by a certain gap and decreases in width along the optical path in order to make the expanded light converge towards an optical fiber of an output end;
   an optical shutter which moves in the space between the input waveguide and the output waveguide and variably attenuates the amount of the light;

an MEMS (micro-electrical-mechanical system) actuator which moves the optical shutter; and a controller which controls the MEMS actuator, wherein a waveguide for control branched off from the output waveguide is adjacent to the output end of the output waveguide, and a photodetector is in front of the output end of the waveguide for control, the controller controls the MEMS actuator depending on the intensity of the light sensed by the photodetector and adjusts the position of the optical shutter.

2. The variable optical attenuator of claim 1, wherein the widths of the input waveguide and the output waveguide increase linearly.

3. The variable optical attenuator of claim 1, wherein the widths of the input waveguide and the output waveguide increase in an arch shape.

4. The variable optical attenuator of claim 1, wherein the input waveguide and the output waveguide are funnel-shaped.

5. The variable optical attenuator of claim 1, wherein a comb drive is used as the MEMS actuator.

6. The variable optical attenuator of claim 1, wherein a scratch drive actuator is used as the MEMS actuator.

7. The variable optical attenuator of claim 1, wherein one side plane of the optical shutter facing the input waveguide is tilted with respect to the optical path.

8. The variable optical attenuator of claim 1, wherein the input waveguide, the output waveguide, the optical shutter and the MEMS actuator are implemented on one board monolithically.

9. The variable optical attenuator of claim 1, wherein the variable optical attenuator is implemented with a combination of a first board on which the input waveguide and the output waveguide are disposed, and a second board on which the optical shutter and the MEMS actuator are disposed.

* * * * *